United States Patent [19]

Wunsch et al.

[11] 4,128,672

[45] Dec. 5, 1978

[54] PROCESS OF MAKING A MAGNETIC RECORDING MEDIUM

[75] Inventors: Gerd Wunsch, Speyer; Paul Deigner, Weisenheim; Roland Falk, Achern; Karl Mahler, Kehl; Werner Loeser, Ludwigshafen; Friedrich Domas, Altlussheim; Peter Felleisen, Lampertheim; Werner Steck, Mutterstadt, all of Fed. Rep. of Germany

[73] Assignee: BASF Aktiengesellschaft, Ludwigshafen, Fed. Rep. of Germany

[21] Appl. No.: 625,659

[22] Filed: Oct. 24, 1975

[30] Foreign Application Priority Data

Oct. 29, 1974 [DE] Fed. Rep. of Germany ....... 2451276

[51] Int. Cl.$^2$ ............................................. H01F 10/00
[52] U.S. Cl. ................................. 427/130; 427/131; 427/132
[58] Field of Search .............................. 427/127–132

[56] References Cited

U.S. PATENT DOCUMENTS

| | | | |
|---|---|---|---|
| 2,819,186 | 1/1958 | Franck | 360/134 X |
| 3,109,749 | 9/1963 | Di Ricco | 427/128 X |
| 3,385,725 | 5/1968 | Schmeckenbecher | 427/132 X |
| 3,470,020 | 9/1969 | Doudreaux | 427/129 |
| 3,520,664 | 7/1970 | York | 427/131 |
| 3,531,322 | 9/1970 | Kefalas et al. | 427/132 X |
| 3,617,378 | 11/1971 | Beck | 428/336 |
| 3,681,225 | 8/1972 | Genma et al. | 427/129 X |
| 3,734,772 | 5/1973 | Schnell et al. | 428/148 |
| 3,767,369 | 10/1973 | Barlow et al. | 427/131 X |
| 3,801,368 | 4/1974 | Fusayama et al. | 427/132 X |
| 3,959,553 | 5/1976 | Hartmann et al. | 427/131 X |

*Primary Examiner*—Bernard D. Pianalto
*Attorney, Agent, or Firm*—Keil, Thompson & Shurtleff

[57] ABSTRACT

A process for the manufacture of rigid magnetic recording media by depositing a cobalt-containing ferromagnetic metal layer on a non-magnetic metallic base disc provided with a cured layer of binder which does not dissolve or swell in organic solvents and contains non-magnetic pigments, and which has been activated, before deposition of the ferromagnetic layer, by treatment with a solution of a palladium (O) complex in an organic solvent, followed by decomposition of this complex, to prepare it to receive the ferromagnetic metal layer which is produced by electroless deposition.

5 Claims, No Drawings

PROCESS OF MAKING A MAGNETIC RECORDING MEDIUM

The present invention relates to improved multi-layer magnetic recording media which comprise a metal film as the ferromagnetic layer.

Magnetic discs of the conventional type as a rule comprise an aluminum substrate and a magnetic layer, applied thereto, consisting of a dispersion of a magnetic pigment in a curable binder. The magnetic layer of magnetic recording media of this type is as a rule from 2 to 4 $\mu$ thick and can be used for recording densities of up to 4,000 bpi. For even higher recording densities — and that is the direction development is taking — magnetic layers which differ from the conventional layers of oxide dispersions with regard to both thickness and magnetic properties are required. German printed application (DAS) No. 2,223,932 discloses that the recording density depends on the thickness of the layer and on the coercive force. For this reason there has been no lack of attempts to reduce the thickness of the layer drastically, i.e., by an order of magnitude, while increasing the packing density and the coercive force. This can be achieved, e.g., by applying ferromagnetic metal films by electrolytic or chemical processes from appropriate metal salt solutions or by vacuum deposition or cathode sputtering of metals of sub-group 8 of the Periodic Table, in a high vacuum.

The provision of suitable substrates is a big problem in the manufacture of magnetic recording media based on thin metallic ferromagnetic films. Since the thickness of metallic ferromagnetic layers is far below the thickness of the magnetic coatings of commercial magnetic storage devices, which coatings are based on dispersions of $\gamma$-iron(III) oxide in a binder, the substrate surface has to conform to very high standards with respect to planeness and freedom from scratches and pinholes. In the case of rigid magnetic discs, the substrate used is an aluminum disc, the surface of which has been rendered particularly smooth by machining, for example by grinding and lapping. However, it is inherent to this type of process, e.g., when lapping aluminum discs, that scratches are frequently produced which are difficult to remove again in a subsequent grinding operation. The smallest depressions in the surface of the substrate, on the other hand, produce recording errors, called dropouts, in the case of very thin films. Conversely, excessive grinding or polishing has an adverse effect on the planeness of the substrate. This in turn leads, in use, to undesirable fluctuations in the signal level if the recorded information is read with a flying head, as is customary with magnetic discs in data processing. A further problem in the manufacture of satisfactory substrates suitable for metal film discs is posed by the quality of the aluminum alloy employed. As is known to those skilled in the art, the aluminum alloys which can be used invariably exhibit oxide inclusions or cavities in the surface, which lead to holes and depressions during subsequent processing and can lead to additional shortcomings if the products are used for magnetic discs. In the case of conventional magnetic layers based on $\gamma$ iron(III) oxide/binder dispersions, which layers are from about 2 to 4 $\mu$ thick, and with recording densities of up to 4,000 bpi, the above-mentioned imperfections do not affect the service characteristics of the magnetic discs as much as in the case of thin metallic magnetic layers of $\leq 1$ $\mu$.

It is known that the disadvantages described above can in part be eliminated by applying a thin metallic intermediate layer, e.g., of nickel or copper. However, this is only possible if the scratches and holes in the aluminum are not too deep, i.e., are not of the order of magnitude of the thickness of the metallic intermediate layer. If the scratches and holes are too deep, very thick metallic intermediate layers (50 to 100 $\mu$) have to be deposited, which is very uneconomical and again raises the problem of providing a smooth coating of constant thickness. A further disadvantage of this process is that sizable holes in the aluminum are not closed even by the metallic intermediate layer so that such substrates cannot be used as bases for ferromagnetic metal films. This means that, with the conventional processes, expensive testing and a large number of substrate rejects is unavoidable.

It is known from U.S. Pat. No. 3,116,159 to provide a flexible base film with an organic intermediate layer and to deposit the metallic magnetic film thereon by a conventional method. German printed application (DAS) No. 1,297,669 discloses a similar process, though with the variation that the activating metal nuclei required for deposition of the metallic layer are added to the intermediate layer of organic binder.

It is a disadvantage of these processes that they give relatively rough surfaces, the roughness being of the order of magnitude of the thickness of the layers to be deposited. This causes a very considerable deterioration in the signal-to-noise ratio, which is a critical parameter, particularly at very high recording densities. A further problem of excessively rough surfaces in the case of flying heads is that the head may strike projections in the surface of the magnetic coating and result in its destruction, the abrasion produced at the point of impact inducing further abrasion.

It is an object of the present invention to provide a particularly advantageous method of manufacturing rigid magnetic recording media using rigid aluminum or aluminum alloy discs which are easily machined and are resistant to metallizing baths and to heat treatment above 200° C., the resulting magnetic discs being suitable, by virtue of their planeness and surface smoothness, for use with magnetic heads which fly at less than 1 $\mu$ from the disc.

We have found that this object is achieved by a process for the manufacture of rigid magnetic recording media by deposition of a thin film of a cobalt-containing ferromagnetic metal on an activated rigid base followed by the application of a less than 0.1 $\mu$ thick protective layer to the surface of the said thin film of cobalt-containing ferromagnetic metal, wherein non-magnetic metallic base discs of which the surfaces carry layers S which are 2 to 100 $\mu$ thick, which layers have been brought by machining to a peak-to-valley height $R_t$ of not more than 0.3 $\mu$, are insoluble in, and virtually non-swellable by, organic solvents and consist of a dispersion of from 0.5 to 5 parts by weight of a finely divided non-magnetic pigment P of a Mohs' hardness of at least 6, in 1 part by weight of a cured binder B which firmly bonds the pigments to the base disc, are activated by treating them with a solution of a palladium(O) complex in an organic solvent and decomposing the complex, and the thin film of ferromagnetic metal having a thickness of about 0.05 to 1 $\mu$ is deposited on the so-activated surface of the base disc by electroless deposition, which electroless film may be thickened by electrolytic deposition.

Conventional non-magnetic metallic base discs of the usual sizes and thicknesses, particularly discs of aluminum or aluminum alloy, may be used in the process according to the invention for the manufacture of magnetic discs. The surfaces of the base discs should advantageously be polished and should preferably have a center line average value $R_a$ of not more than about 0.05 $\mu$ and a peak-to-valley height $R_t$ of not more than about 0.3 $\mu$.

The particulate non-magnetic pigment P used in the manufacture of the layers S should have a Mohs' hardness of at least 6 and should furthermore be sufficiently chemically resistant to the metallic base disc, e.g., to the reducing properties of aluminum, and should of course also be heat-stable up to at least about 250° C. and preferably up to 400° C. Suitable non-magnetic pigments P are, e.g., hard oxides, carbides or nitrides of metals, such as aluminum oxide ($Al_2O_3$), chromium(III) oxide ($Cr_2O_3$), quartz ($SiO_2$), cerium dioxide ($CeO_2$), $\alpha$-iron-(III) oxide ($\alpha$-$Fe_2O_3$), and titanium dioxide ($TiO_2$). Acicular $\alpha$-$Fe_2O_3$ which has been obtained from acicular $\alpha$-$Fe_2O_3$ by a heat treatment, i.e., by heating it above the Curie point, has proved very suitable for the production of the layers S. The particle size of the non-magnetic pigments used in the layers S should in general not be substantially greater than the ultimate thickness of the layer S and is in general from about 0.1 to 15 $\mu$ and, in the preferred embodiment of the process, not more than from about 1.5 to 2 $\mu$.

The pigments P contained in the layers S are firmly embedded in a cured binder B. Curable binders B which can be used to produce the layers S include all binders which adhere sufficiently firmly to the metallic base discs used, e.g., the aluminum discs, possess adequate binding power for the non-magnetic pigment particles and give, after baking a layer of the dispersion of the non-magnetic pigments in the binder, a tough layer having a hard surface which can be ground and/or polished. The latter aspect is of great importance for obtaining a surface having a small peak-to-valley height.

Binders which, in the form of their solutions or solutions of their components, are particularly suitable for the production of the layers S are those based on polyurethanes, e.g., mixtures of polyisocyanates with relatively high molecular weight compounds having active hydrogen atoms which react with isocyanate groups, such as polyethers or polyesters containing hydroxyl groups, and mixtures of such polyurethane binders with other binders, e.g., curable epoxy resins and curable aminoplast, melamine and phenolic resins; curable epoxy resins and their mixtures with, e.g., polyaminoamides or other polymers which react with epoxy resins, or with low molecular weight curing agents; and mixtures of curable epoxy resins, such as polyglycidyl ethers obtained from polyhydroxy compounds and epichlorohydrin, with curable melamine-formaldehyde precondensates or appropriate phenol-formaldehyde precondensates which have been plasticized, for example etherified with alcohols of 1 to 4 carbon atoms. Mixtures of curable epoxy resins or polyepoxide compounds with curable precondensates of phenols or alkylphenols with formaldehyde, which have preferably been produced in an alkaline medium by reacting the phenolic compounds with a 1.5- to 3-fold molar amount of formaldehyde, and of which the hydroxyl groups have been etherified at least partially with aliphatic alcohols of 1 to 4 carbon atoms, are very suitable.

The weight ratio of finely divided pigment to binder in the dispersion for producing the layer S is in general from about 0.5:1 to about 5:1 and preferably from about 1.2:1 to 3:1.

Solvents which can be used to produce the pigment/binder dispersion and apply it to the base disc are the volatile solvents and solvent mixtures conventionally used in the surface-coating industry, in which the binders or binder components used are soluble, e.g., aromatic hydrocarbons, such as benzene, toluene or xylenes, volatile alcohols and glycols, such as propanol, butanol or ethylene glycol or their ethers and/or esters, such as ethylene glycol monoethyl ether or ethylene glycol monoethyl ether monoacetate (also called ethylglycol acetate), ketones, such as acetone, methyl ethyl ketone and cyclohexanone, amides, such as dimethylformamide, ethers, such as tetrahydrofuran and dioxane and their mixtures.

To produce the dispersion, the non-magnetic pigment or a mixture of different non-magnetic pigments is dispersed in the curable binder and a sufficient amount of solvent, using conventional equipment, for example a ball mill or tube mill. The application of the dispersion to the metallic base disc may also be effected by conventional methods. A very suitable method has proved to be first to apply a layer of the dispersion to the slowly rotating base discs (e.g., at a speed of from about 100 to 500 rpm), e.g., by spraying, to give a thickness of, e.g., from about 1 to about 3 mm, and then to produce the desired thickness of the layer S, e.g., preferably from 2 to 15 $\mu$, by rotating the disc at a higher speed (preferably at from about 1,000 to 3,000 rpm). An example of an application technique which can be used is described in U.S. Pat. No. 2,913,246. In the preferred embodiment, the base discs are simultaneously provided with the layers S on both sides (cf. German printed application (DAS) No. 2,157,650). After the coating operation is over, the layers S are cured or baked. In this treatment, the coated base disc is advantageously heated at about 120° to 250° C. for, e.g., from ¼ to 1 hour, the curing temperature and curing time depending on the binder system used.

The baking step is advantageously followed by machining, such as grinding and polishing, of the surface of the cured layers S to produce the desired slight surface roughness which after machining should correspond to an $R_t$ value of less than 0.5 $\mu$ and preferably less than 0.3 $\mu$. It has proved very advantageous to polish the surface of the layers S with a suitable polishing agent, such as very fine diamond powder, boron carbide powder or similar finely divided abrasives in the form of a paste, preferably on felt discs and especially on discs of a polyvinyl alcohol sponge as the carrier material, the discs being pressed, whilst rotating, against the layers. The pressure used is in general at least 0.02 kg/cm² and preferably about 0.8 to 2.0 kg/cm². Fluids such as paraffin oils with boiling points of from about 120° to 240° C. have proved to be suitable polishing fluids.

The peak-to-valley height of the surface of the layers S was measured according to DIN 4762, using the Hommel Tester TR (manufactured by Fa. Hommel, Mannheim, Germany).

The thickness of the cured, machined layers S is in general from about 2 to 100 $\mu$ and preferably from about 2 to 10 $\mu$.

Prior to the activation, according to the invention, of the base disc provided with the layers S (hereinafter referred to as "base $T_s$"), it is advisable, to clean the base $T_s$, e.g., rinse it with the solvent which is used in the palladium(O) complex solution in the subsequent activation.

Particularly suitable palladium(O) complexes for the activation treatment of the base $T_s$ with solutions of palladium(O) complexes in an organic solvent are those which contain, as ligands A. unsaturated ketones of the formula

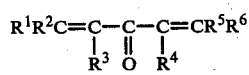

wherein $R^1$, $R^3$, $R^4$ and $R^6$ are hydrogen or alkyl of 1 to 5 carbon atoms and $R^2$ and $R^5$ are alkyl of 1 to 5 carbon atoms or aryl or cycloalkyl of 6 to 11 carbon atoms, or B. phosphites of the formula

wherein R is alkyl or aryl, as so-called n-doners, i.e., compounds having one or more atoms with lone electron pairs, together with C. olefinically or acetylenically unsaturated organic compounds of 3 to 16 carbon atoms as $\pi$-acceptors, which ligands B and C are capable of at least partially displacing the ligands A in the system palladium(O)-ligand A.

The process is preferably carried out with solutions of the complexes in benzene, especially in an alkyl-substituted benzene, e.g., ethylbenzene, xylene or, preferably, toluene.

Preferred palladium(O) complexes with unsaturated ketones of the formula A are the complexes or systems of palladium(O) with dibenzalacetone

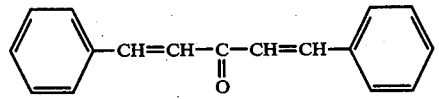

which not only exhibit a good activating action but also particularly high stability in solution in the above solvents. Though the palladium(O) complexes, e.g., the palladium(O) dibenzalacetone complex, are frequently represented in a simplified form as Pd(dba)$_2$, the complexes contain one or more palladium atoms, depending on the conditions under which they are synthesized, and it would therefore be better to refer to them as palladium(O)-ligand systems.

Examples of phosphite ligands B are the trialkyl phosphites in which each alkyl is of 1 to 5 carbon atoms, and, preferably, the triaryl phosphites in which each aryl is of 6 to 10 carbon atoms, and especially triphenyl phosphite.

Ligands C which are particularly suitable as $\pi$-acceptors are the esters and above all the alkyl esters of maleic acid or fumaric acid and, preferably, maleic anhydride. Very suitable esters of this type are dimethyl maleate and dimethyl fumarate. Acrylonitrile and olefinically unsaturated monomers with e-values greater than 1.2 (cf. "Polymer Handbook," Interscience Publ., New York, 1966, page II-341) may also be used.

Examples of suitable acetylenically unsaturated organic compounds of 6 to 16 carbon atoms which act as $\pi$-acceptors and ligands in the palladium(O) complexes alongside the above phosphite ligands are the acetylenically unsaturated hydrocarbons and compounds in which the acidic groups have been replaced for example by COO-alkyl or CO-alkyl groups, in particular 1,4-butynediol and 1,4-butynediol dialkyl ethers, e.g., 1,4-butynediol dimethyl ether.

The preferred palladium(O) complexes are those which contain maleic anhydride and triphenyl phosphite, or dimethyl maleate and triphenyl phosphite, as ligands, and especially the palladium(O) dibenzalacetone complexes, which have proved particularly suitable.

The palladium(O) complexes with unsaturated ketones A may be manufactured in the manner described in Experiment 1. The mixed palladium(O) phosphite complexes which contain olefinically or acetylenically unsaturated compounds as ligands C are preferably manufactured by adding the phosphite (ligand B) to the palladium(O) dibenzalacetone complex and then adding the olefinically or acetylenically unsaturated compound (ligand C), e.g., maleic anhydride or 1,4-butynediol dimethyl ether, or by adding the ligand C to the palladium(O) dibenzalacetone complex and then adding the ligand B.

The stability of the solutions of the said palladium(O) complexes may be increased by using benzene and, in particular, alkylated benzenes, e.g., toluene, as the solvent. The concentrations of the complexes in the solutions are from about 15 mg/l to the saturation concentration at room temperature, and preferably from about 50 mg/l to 2 g/l, depending on the nature of the complex and of the solvent. Although halohydrocarbons and, e.g., acetonitrile, tetrahydrofuran or dimethylformamide are less suitable solvents because they may slightly decompose the metal complexes, this decomposing effect may be used to activate the substrate. We have found it possible, after dipping a base $T_s$ into a solution of palladium dibenzalacetone complex in toluene and then dipping the treated substrate into a chlorinated hydrocarbon, e.g., dichloroethylene, trichloroethylene or tetrachloroethylene, at room temperature, to electrolessly plate the base $T_s$, for example, in a cobalt salt bath. The complexes which are preferentially used are only slightly soluble in solvents, e.g., ethanol, methanol and cyclohexane. We have found that the stability of the palladium(O) complex solution used for activation may be further increased by admixture of further potential complex-forming agents as n-donors and $\pi$-acceptors, e.g., bis-(1-pyrazolyl)-2-methane and, especially, azobenzene.

In the process according to the invention, swelling of the surface of layers S is not necessary for activation since the nucleation centers are formed directly on the substrate surfaces, e.g., as palladium nuclei of from about 50 to 100 Å in size, or as substantially coherent palladium films. This is particularly clear in the preferred method of activation, where the bases $T_s$ heated to from about 100° to 300° C., and especially from 130° to 250° C., are dipped into the palladium(O) complex solutions. It is surprising that, e.g., the palladium(O)-dibenzalacetone complex solutions are not only distinguished by good stability in air but, though they are themselves heat-labile, remain stable, in the form of solutions in toluene, even after being used practically daily for 2 months, and showed no appreciable decomposition of the complex, though the bases $T_s$ were always at from about 200° to 250° C. when dipped into the solutions at room temperature. The system

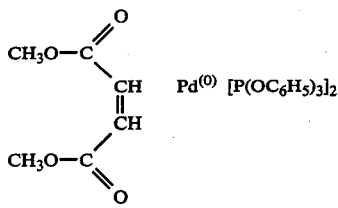

in toluene proved almost equally stable. Preferably, the heated base $T_s$ is dipped into the palladium(O) complex solutions (which are kept at about room temperature) under an inert gas, e.g., under nitrogen, carbon dioxide or rare gases. Though a single dip of the hot base $T_s$ into the palladium(O) complex solutions is in most cases sufficient, such dipping can of course also be carried out several times, e.g., from 2 to 4 times. The number of dips (activations) is above all determined by the temperature employed, the heat storage capacity of the substrate, the nature and concentration of the complex and of the solvent and the nature of the additives in the solution. Preferably, the substrates are briefly grounded because of the risk of their becoming electrostatically charged.

In a suitable apparatus for the activation treatment, the container for the activating bath is provided with a slit-shaped orifice through which the heated bases $T_s$ can briefly be introduced into the palladium(O) complex solution in the container. If the bases are dipped in rapid succession, the container may be equipped with cooling means which keep the solution at about room temperature or below about 50° C.

To prevent the complex solutions from leaving streaks on the surface of the disc when it is removed from the activating bath, which streaks may remain visible after metallizing, it has proved advantageous to rinse the bases $T_s$ with a solvent, preferably with the same solvent as is used in the complex solution, after the dipping treatment.

Of course it is also possible to effect the activation according to the invention by dipping the bases $T_s$ at about room temperature, one or more times, into the palladium(O) complex solution (at about room temperature) and heating the treated bases $T_s$ between dips, or after dipping.

Conventional methods and suitable conventional metallizing baths may be employed for the subsequent electroless deposition of the thin film of a ferromagnetic cobalt-containing metal which may be optionally thickened by electrolytic deposition; these are described, e.g., in the monograph by W. Goldie, Metallic Coating of Plastics, Vol. I, Electrochemical Publications Ltd., Hatch End, Middlesex, England, 1968, especially in Chapter 9, in the monograph by F. A. Loewenheim, Metal Coating of Plastics, Noyes Data Corp., Park Ridge, N. J., 1970 and especially by A. Brenner and G. E. Riddell in J. Res. Natl. Bur. Std., 37 (1) 31 (1946) and Proc. Amer. Electroplaters Society, 34 (1947), 156, and in U.S. Pat. Nos. 2,532,283; 2,532,284; 3,423,214; and 3,360,397, and in German published application (DOS) No. 2,236,670.

Particularly suitable cobalt-containing ferromagnetic thin metal layers are composed of cobalt-phosphorus, cobalt-nickel-phosphorus and similar ferromagnetic alloys, the magnetic properties being greatly influenced by the Co/Ni ratio. The deposited magnetic films are from about 0.05 to 1 $\mu$, and especially from 0.08 to 0.5 $\mu$, thick and in general have a coercive force Hc of from about 23 to 75 kA/m. The coercive force of the magnetic layer can be increased by subsequent heating of the layer at from about 150° to 300° C. under an inert gas.

The deposited magnetic films can be provided, by conventional methods, with a protective film which is in general less than 0.2 $\mu$ thick and in particular less than 0.05 $\mu$ thick, e.g., with a cobalt oxide film as disclosed in German printed application (DAS) No. 1,279,427, a coating of rhodium or tungsten carbide, a silicone film, a wax film, a polymer film or a combination of such materials. Treatment of the surface of the thin layer of ferromagnetic cobalt-containing metal according to the process disclosed in German published application (DOS) No. 2,220,694 has proved best. In this process, a solution of a film-forming organic synthetic resin in a volatile solvent is applied to the thin film of cobalt-containing ferromagnetic metal, the layer of solution in the dried, but not baked, state being not more than 0.3 $\mu$ thick and in particular not more than 0.05 $\mu$ thick, and the applied layer is dried and baked for from about 1 to 15 hours at from about 200° to 300° C. in an atmosphere containing oxygen. Preferably, the applied layer is, after baking, no longer identifiable as a separate layer.

The process according to the invention is more economical than prior art processes because, owing to the fact that the layers S compensate for defects in the metal base disc, and the base $T_s$ provided with the layers S can be readily machined and is resistant to basic and acid metallizing baths, it reduces the number of base disc rejects and thus makes possible the production, in large numbers, of magnetic discs which are capable of withstanding repeated momentary contact or sustained direct contact with magnetic heads without exhibiting any signs of damage even after being in operation for several hours.

In the following Experiments and Examples, the parts and percentages are by weight, unless stated otherwise. Parts by volume bear the same relation to parts by weight as the liter to the kilogram.

EXPERIMENT 1

Preparation of a palladium(O)-dibenzalacetone complex

15 Parts of $PdCl_2$ (59.75% Pd) in a solution of 10.7 parts of sodium chloride in 65 parts by volume of water, are heated to the boil, with thorough stirring, until all the $PdCl_2$ has dissolved. The water is then distilled off. The residue is taken up in 200 parts by volume of methanol. The solution is heated to 60° C., 61.5 parts of dibenzalacetone, 42.8 parts of $CH_3COONa.3H_2O$ and 175 parts of methanol are added, and the mixture is kept at 60° C. for a further 5 minutes. The batch is then allowed to cool. A precipitate forms, which is filtered off under argon, and is washed three times with water, each time with about 100 parts by volume, and twice with methanol, each time with about 50 parts by volume. The product is dried under reduced pressure at room temperature. The red-violet crystals are readily soluble in aromatic hydrocarbons, e.g., benzene or toluene. This compound will be hereinafter referred to as the Pd-dba complex.

EXPERIMENT 2

Preparation of a palladium(O)/dimethyl maleate/triphenylphosphite complex 3.6 Parts of triphenylphosphite are added to a solution of 2.9 parts of the Pd-dba complex in 50 parts by volume of acetone, with thorough stirring, whereupon the color of the batch changes from a reddish brown to a dark yellowish green. 0.8 part of dimethyl maleate is added to the homogeneous solution and the batch is stirred for 2 hours at room temperature and then filtered under argon to remove traces of a black precipitate. The filtrate is concentrated under reduced pressure to give a mixture of an oil and brown crystals. The residue is taken up in 50 parts by volume of ether, the ether solution is filtered to remove insoluble matter and the filtrate is concentrated until crystallization starts; the crystallization can be intensified by adding 10 parts by volume of methanol. 1.3 Parts of a lemon-colored substance are obtained. The complex is readily soluble in alkyl-aromatics and in benzene.

EXPERIMENT 3

A solution of a further palladium(O) complex is prepared by adding 1.2 parts of triphenylphosphite followed by 0.7 part of azobenzene to a solution of 0.58 part of the Pd-dba complex in 500 parts by volume of toluene. A homogeneous solution of the complex is obtained.

EXAMPLE 1

(a) Manufacture of the base $T_s$ 1,694 Parts of a finely divided acicular $\alpha$-$Fe_2O_3$, manufactured by heating acicular $\gamma$-$Fe_2O_3$ to above the Curie point, and having an average particle size of less than 1.5 $\mu$, are mixed with 808 parts of a 50% strength solution of a commercial epoxy resin, obtained from bisphenol A and epichlorohydrin and having an epoxide value of 0.2 in ethylglycol acetate, 25 parts of a commercial polydimethylsiloxane, of which a 70% strength solution of xylene has a viscosity of from 700 to 1,000 cp, and 1,569 parts of a mixture of equal parts of ethylglycol acetate, cyclohexanone and dimethylformamide, and the mixture is dispersed for 40 hours in a ball mill. 260 parts of a commercial curable p-allyloxy-phenyolformaldehyde condensate of the resol type and 376 parts of the above epoxy resin solution are then added, the mixture is dispersed in the ball mill for a further 6 hours, and the dispersion is filtered through a filter of 2 $\mu$ pore size. The filtered dispersion is then applied via a nozzle to both sides of an anodized 14 inch aluminum disc rotating (at about 350 rpm) in an inclined position, after which the excess dispersion is flung off by increasing the speed of rotation of the disc to about 2,500 rpm. The layers S, each about 3 to 4 $\mu$ thick, are then heated for 1 hour at 200° C.

The layers S are polished with a diamond paste of 7 $\mu$ particle size, applied to a tough, elastic polyvinyl alcohol sponge disc as carrier; this disc is caused to rotate while being pressed against the surface of the layers S. The polishing fluid is a paraffin oil of boiling range 120° to 200° C. After polishing and cleaning the surface, the surface roughness of the layers S is measured; it is found that the $R_a$ value is 0.015 $\mu$ and the $R_t$ value 0.15 $\mu$.

(b) Activation and Metallization

The 14 inch aluminum disc provided on both sides with a layer S of $\alpha$-$Fe_2O_3$ dispersion is cleaned by rinsing it briefly with toluene, heated to 240° C. and then rapidly dipped into a solution of the Pd(O) dba complex, prepared according to Experiment 1, dissolved in toluene (concentration 1 g/liter). After a few seconds, the disc is taken out of the solution and dried in air. The heating and dipping process is repeated four times in all. The dry treated base is then rinsed with methanol and a thin film of ferromagnetic Co-P metal is deposited on the base in a conventional cobalt-coating bath containing a cobalt salt, a conventional complex-forming agent, sodium hypophosphite and an ammonium compound, at about 75° C. and a pH of about 8.2. A coherent glossy Co-P film of about 0.2 $\mu$ thickness was produced which exhibited the following magnetic properties (measured at 160 kiloamps/m):

Hc = 40 kiloamps/m; $\phi_m/b$ = 210 nWb/m, $\phi_r/b$ = 120 nWb, $\phi_r/\phi_m$ = 0.55.

(c) Application of a protective layer 3.5 Parts of a commercial phenoxy resin of bisphenol A and epichlorohydrin and 1.5 parts of a commercial heat-curable condensate of tert-butylphenol and formaldehyde (prepared by alkaline condensation using from 0.5 to 2 moles excess formaldehyde, the condensate being in the form of a 60% strength solution in n-butanol) are dissolved in 995 parts of ethylglycol acetate. The solution is applied to the thin film of metal whilst excluding dust, and a thin overcoating is produced by spinning, and is dried. The thickness of the overcoating is about 0.05 $\mu$. The recording medium coated in this way is then baked for 4 hours in air at about 280° C. Thereafter, the applied overcoating is no longer identifiable as a separate layer.

The resulting magnetic disc has a surface exhibiting excellent scratch and wear resistance when used with flying heads or contact heads. Frequent mounting and dismounting also caused no damage to the discs. Compared to a commercial magnetic disc whose magnetic layer was made from a $\gamma$-$Fe_2O_3$ dispersion, the disc produced according to Example 1(a) to (c) showed a 20% better resolution and a 50 to 100% higher read voltage. The favorable waveform of the discs shows that the magnetic layer is of uniform thickness, which is attributable to the effective activation with the Pd(O) complex solution. The discs also have good corrosion resistance, as found in a test using a temperature cycle of from −40° to +60° C., at up to 80% relative humidity.

EXAMPLE 2

(a) Manufacture of the Base $T_s$

This is carried out analogously to Example 1a except that in place of $\alpha$-$Fe_2O_3$, rutile ($TiO_2$) is employed as the pigment P for the dispersion.

(b) Activation and Metallization

The procedure followed is analogous to Example 1b except that the base $T_s$ is each time heated to about 200° C. and dipped into a solution of the Pd(O) complex prepared according to Experiment 3 in toluene. The treatment is again carried out four times. Metallization is carried out in accordance with Example 1b, but at 60° C. and pH 8.5. After 10 minutes, a coherent glossy Co-P film of about 0.1 $\mu$ thickness has been produced which exhibits the following magnetic properties (measured at 160 kiloamps/m):

Hc = 74 kiloamps/m, $\phi_m/b$ = 78 nWb/m, $\phi_r/b$ = 46 nWb/m, $\phi_r/\phi_m$ = 0.59.

(c) Application of the Protective Layer 10 parts of a commercial hydroxyl-containing low molecular weight polyester obtained from o-phthalic acid and an aliphatic polyol and containing about 8.5% of hydroxyl groups, and 16 parts of a 75% strength solution of a commercial reaction product obtained from 1 mole of 1,1,1-trimethylolpropane and 3 moles of toluylenediisocyanate and containing about 13% of NCO groups, in ethyl acetate, are dissolved in 974 parts of ethylglycol acetate. The magnetic disc is coated with this solution as in Example 1 (c), and the coating is baked for 5 hours in air at 260° C. After baking, the disc has a particularly scratch-resistant and wear-resistant surface exhibiting very good hardness and a low coefficient of friction, though the applied overcoating is no longer identifiable as a separate layer. No adverse effect was detectable in the corrosion test (cf. Example 1). On testing the adhesion of the magnetic layer, the amount pulled away from the base was zero under a tension of 349 N/cm$^2$. According to the waveform of the disc, the thickness of the magnetic layer is uniform.

EXAMPLE 3

(a) Manufacture of the Base $T_s$

This is carried out analogously to Example 1(a).

(b) Activation and Metallization

The procedure followed is analogous to Example 1(b), except that the base $T_s$, heated to 240° C., is rapidly dipped for a few seconds into a solution of the Pd(O) complex, prepared according to Experiment 2, in toluene (concentration 0.5 g/liter) and is then dried. The treatment is carried out twice. The metallization was carried out over 14 minutes, in the manner described in Example 1(b). The resulting dense and coherent Co-P magnetic film had a glossy surface, was 0.4 μ thick and exhibited the following magnetic properties (measured at 160 kiloamps/m):

Hc = 41.1 kiloamps/m, $\phi_m$/b = 453 nWb/m, $\phi_r$/b = 257 nWb/m, $\phi_r/\phi_m$ = 0.57.

(c) Application of the Protective Layer

This is carried out as in Example 2(c).

The resulting disc exhibited excellent electromagnetic properties (read voltage and resolution), very good wear and scratch resistance, good corrosion resistance and good adhesion.

We claim:

1. In a process for the manufacture of rigid magnetic recording media in which a thin film of a cobalt-containing ferromagnetic metal having a coercivity of from 23 to 75k A/m is deposited by electroless deposition on an activated rigid base followed by the application of a less than 0.1 μ thick protective layer to the surface of the said thin film of cobalt-containing ferromagnetic metal and said rigid base includes a non-magnetic metallic base disc at least one surface of which carry a layer (S) from 2 to 100 μm thick, which layer (S) has been brought by machining to a peak-to-valley height $R_t$ of not more than 0.3 μ, is insoluble in, and virtually non-swellable by, organic solvents and consists of a dispersion of from 0.5 to 5 parts by weight of a finely divided non-magnetic pigment (P) of a Mohs' hardness of at least 6, per part by weight of a cured binder (B) which firmly bonds the pigments to the base disc, the improvement which comprises: activating the surface of the base disc by treatment with a solution of a palladium(O) complex in an organic solvent and decomposing the complex, and thereafter depositing a thin film of ferromagnetic metal of about 0.05 to 1 μ thickness on the so-activated surface of the base disc by electroless deposition.

2. A process as set forth in claim 1, wherein the magnetic thin film produced by electroless deposition is thickened by electrolytic deposition.

3. A process as set forth in claim 1, wherein the recording medium carrying the thin film of ferromagnetic metal is heated at from about 150° to 300° C. under an inert gas.

4. A process as set forth in claim 1, wherein the palladium(O) complexes are decomposed by heating in the course of activating the machined layer (S).

5. A process as set forth in claim 1, wherein a solution of a film-forming organic synthetic resin in a volatile solvent is applied to the thin film of cobalt-containing ferromagnetic metal in such an amount that the thickness of the layer of solution in the dried but not baked state is not more than 0.3 μ, and the applied layer is dried and baked for from about 1 to 15 hours in an oxygen-containing atmosphere at from about 200° to 300° C.

* * * * *